502-45
9/2/86 SR
03 RE 32,239

United States Patent [19]

Schwartz

[11] E Patent Number: Re. 32,239

[45] Reissued Date of Patent: Sep. 2, 1986

[54] MOVING BED CATALYTIC CRACKING PROCESS WITH PLATINUM GROUP METAL OR RHENIUM SUPPORTED DIRECTLY ON THE CRACKING CATALYST

[75] Inventor: Albert B. Schwartz, Philadelphia, Pa.

[73] Assignee: Mobil Oil Corporation, New York, N.Y.

[21] Appl. No.: 737,641

[22] Filed: May 24, 1985

Related U.S. Patent Documents

Reissue of:

[64] Patent No.: 4,473,658
Issued: Sep. 25, 1984
Appl. No.: 524,103
Filed: Aug. 17, 1983

U.S. Applications:

[63] Continuation of Ser. No. 430,160, Sep. 30, 1982, abandoned, which is a continuation of Ser. No. 875,255, Feb. 6, 1978, abandoned, which is a continuation of Ser. No. 599,920, Jul. 28, 1975, abandoned, which is a continuation-in-part of Ser. No. 440,890, Feb. 8, 1974, abandoned, which is a continuation-in-part of Ser. No. 399,008, Sep. 20, 1973, abandoned.

[51] Int. Cl.[4] ..... B01J 29/38; B01J 21/20; B01J 38/22; C10G 11/05

[52] U.S. Cl. ..... 502/45; 208/120; 208/165; 208/174; 502/46; 502/47

[58] Field of Search ..... 502/45-48; 208/113, 120, 165, 166, 174

[56] References Cited

U.S. PATENT DOCUMENTS

| | | | |
|---|---|---|---|
| 2,723,234 | 11/1955 | Bergstrom et al. | 502/45 |
| 2,941,956 | 6/1960 | Bergstrom | 502/45 |
| 3,364,136 | 1/1968 | Chen et al. | 502/38 |
| 3,649,521 | 3/1972 | Martin | 208/120 |
| 3,650,990 | 3/1972 | Frillette et al. | 502/74 |
| 3,679,563 | 7/1972 | Pollock | 208/166 |
| 3,788,977 | 1/1974 | Dolbehr et al. | 502/63 |
| 3,909,392 | 9/1975 | Horecky et al. | 502/42 |
| 3,962,778 | 12/1975 | Owen et al. | 208/120 |

*Primary Examiner*—P. E. Konopka
*Attorney, Agent, or Firm*—A. J. McKillop; M. G. Gilman; L. P. Hobbes

[57] ABSTRACT

An improved moving bed continuous catalytic cracking process for cracking hydrocarbon feedstocks, such as gas oil, in the absence of added hydrogen, which includes the use of a minute amount of dispersed platinum supported directly on a cracking catalyst. The trace of platinum induces a substantial increase in the heat efficiency with which coke on catalyst is converted to $CO_2$ in the regenerator section with minimal or no detriment to the cracking reaction.

5 Claims, 3 Drawing Figures

CRACKING APPARATUS

EFFECT OF KILN BED TEMPERATURE ON PERCENT CO IN BOTTOM FLUE

CO-OXIDATION TESTS

MOVING BED CATALYTIC CRACKING PROCESS WITH PLATINUM GROUP METAL OR RHENIUM SUPPORTED DIRECTLY ON THE CRACKING CATALYST

Matter enclosed in heavy brackets [ ] appears in the original patent but forms no part of this reissue specification; matter printed in italics indicates the additions made by reissue.

CROSS-REFERENCE TO RELATED APPLICATIONS

This is a continuation of application Ser. No. 430,160, filed on Sept. 30, 1982, now abandoned, which is a continuation of application Ser. No. 875,255, filed Feb. 6, 1978, now abandoned, which is a continuation of application Ser. No. 599,920, filed July 28, 1975, now abandoned, which in turn is a Continuation-In-Part of application Ser. No. 440,890, filed Feb. 8, 1974, now abandoned, which in turn is a Continuation-In-Part of application Ser. No. 399,008, filed on Sept. 20, 1973, now abandoned.

BACKGROUND OF THE INVENTION

1. Field of the Invention

The present invention is concerned with catalytic cracking of hydrocarbon streams in the absence of added hydrogen to produce gasoline and fuel oil. In particular, this invention is concerned with an improved process of the moving bed type, in which the improvement, in one aspect, resides in utilizing a platinum promoted cracking catalyst that converts coke to carbon dioxide with high thermal efficiency.

2. Description of Prior Art

Continuous catalytic cracking in moving bed systems is extensively used in petroleum refining to reduce the boiling range of relatively nonvolatile petroleum fractions, such as gas oil, thereby producing high quality gasoline and fuel oil. The process, as actually used, differs in particulars from refinery to refinery. However, all installations use 4 to 20 Tyler mesh size particles of a high surface area, inorganic porous acidic solid as catalyst; all operate in the absence of added hydrogen; and all utilize a continuous feed of the stream to be cracked, as well as continuous cyclical transport of an active inventory of catalyst between a regeneration zone and a cracking zone.

The cracking apparatus itself is sub-divided into a cracking section that includes a cracking zone, and a regenerator section that includes a regeneration zone or kiln. A suitably prepared hydrocarbon stream and hot regenerated catalyst are continuously passed through the reactor section under cracking conditions at elevated temperatures. During passage through the cracking zone, the hydrocarbon stream is cracked, and the active catalyst becomes deactivated by a deposit of substantially nonvolatile, combustible coke. The cracked products are separated from the deactivated, spent catalyst in some region in the cracking section, and are passed to a fractionation system for recovery of the desired fractions. Simultaneously, the spent catalyst is continuously passed to a regenerator section where it is contacted with air or with other oxygen containing gas at a temperature sufficiently high to burn the coke and thus regenerate active catalyst. During the combustion, the catalyst particles are reflexively heated, i.e., the particle acquires a major fraction of the heat generated by the combustion, so that the regenerated catalyst is considerably hotter than the spent catalyst. Within the regenerator section the regenerated catalyst is separated from the flue gas which is continuously discharged, and the hot regenerated catalyst itself is continuously discharged and returned to the reactor section where it provides not only the required catalytic activity, but also some or all of the heat required to vaporize and/or to heat the hydrocarbon feed to cracking temperature, as well as the heat that may be required to convert a feed to the cracked state. The cracking of a feed, in itself, is therefore endothermic because of these different heat requirements.

The process just described has evolved into a highly efficient operation with the advent of modern catalysts and improvements in the apparatus. Catalyst improvements, in particular, have made it possible to make more high quality gasoline at the expense of coke and gas, i.e., catalyst selectivity in the cracking section has been improved. However, there are persistent inefficiencies and problems associated with the regenerator section. These inefficiencies and problems come about because, in general, the flue gas formed in the regenerator contains large amounts of CO (carbon moxoxide) as well as $CO_2$ (carbon dioxide).

It is known to those skilled in the art of catalytic cracking that only about four tenths of the total heat of combustion of a coke deposit is released in the kiln on conversion to CO. Thus, if the combustion in the regenerator produces one mole of CO for each mole of $CO_2$, for example, only about seven tenths of the potential total heat of combustion is released; the remaining three tenths, or 30%, is carried by the latent heat of combustion of the CO, and may be released by the reaction of $$CO + \tfrac{1}{2}O_2 \rightarrow CO_2$$

In many installations the carbon monoxide in the flue gas is burned in a separate plant to make steam and/or reduce CO emissions to meet standards.

The incomplete combustion just described, of course, limits the reflexive heating of the catalyst and, in practical operation, limits the flexibility of the process and the overall efficiency achievable. For example, catalysts of very high selectivity (i.e. high efficiency) and/or low coke-producing feeds may not produce sufficient heat in the regeneration zone for optimal operation of the process. In one instance, for example, insufficient heat may be available to maintain an optimal cracking temperature in the cracking zone. In another instance, inefficient cracking may result from a temperature in the regeneration zone which is not sufficiently high to provide optimal regeneration (i.e., too high a residual carbon on generated catalyst). In still another instance, the temperature in the regenerator will become too low to support the combustion, and the burning stops altogether causing shutdown of the plant. In such situations, it would be highly desirable to increase the $CO_2/CO$ mole ratio of the combustion products formed in the regeneration zone, thereby increasing the reflexive heating of the catalyst. While means other than reflexive heating may be employed, such as increasing the feed preheat for example, such means are more cumbersome and/or more costly or otherwise less desirable.

Additionally, when excess oxygen is contained in the combustion gases in the regenerator section, especially after separation of the catalyst from the flue gas, erratic ignition of the gaseous mixture (known as "afterburning") often can and does occur. This may lead to damage to the apparatus and/or catalyst from the resulting hot spots.

U.S. Pat. No. 2,436,927 issued Mar. 2, 1948, discusses the inclusion of a carbon monoxide oxidizing catalyst with the cracking catalyst in fluidized catalytic cracking process to eliminate afterburning. Copper, chromium, manganese, cobalt and nickel are recited therein as effective. It has been proposed to alleviate the CO problem in moving bed systems by adding a small amount of chromic oxide to the catalyst, as described in U.S. Pat. No. 2,647,860, issued Aug. 4, 1953. This is reported to cause a small but tolerable impairment in gasoline yield.

BRIEF SUMMARY OF THE INVENTION

It has now been found that the moving bed catalytic cracking process is substantially improved by the utilization of a cracking catalyst promoted with a minute amount of dispersed platinum. The cracking catalyst employed in the present invention comprises a crystalline aluminosilicate zeolite having a pore diameter of 6 to 15 Angstroms. The improved process is characterized by increased reflexive heating in the regenerator, with minimal detriment to the cracking operation. Surprisingly, this advantage is achieved even when only a fraction of the active inventory of cracking catalyst is promoted as described. Furthermore, the desirable results of this invention persist for a substantial length of time, i.e. the promoter itself does not rapidly deactivate. It is a feature of this invention that even with complete deactivation of the promoter, the catalyst functions as an effective cracking catalyst.

DETAILED DESCRIPTION OF THE INVENTION

Figure 1:
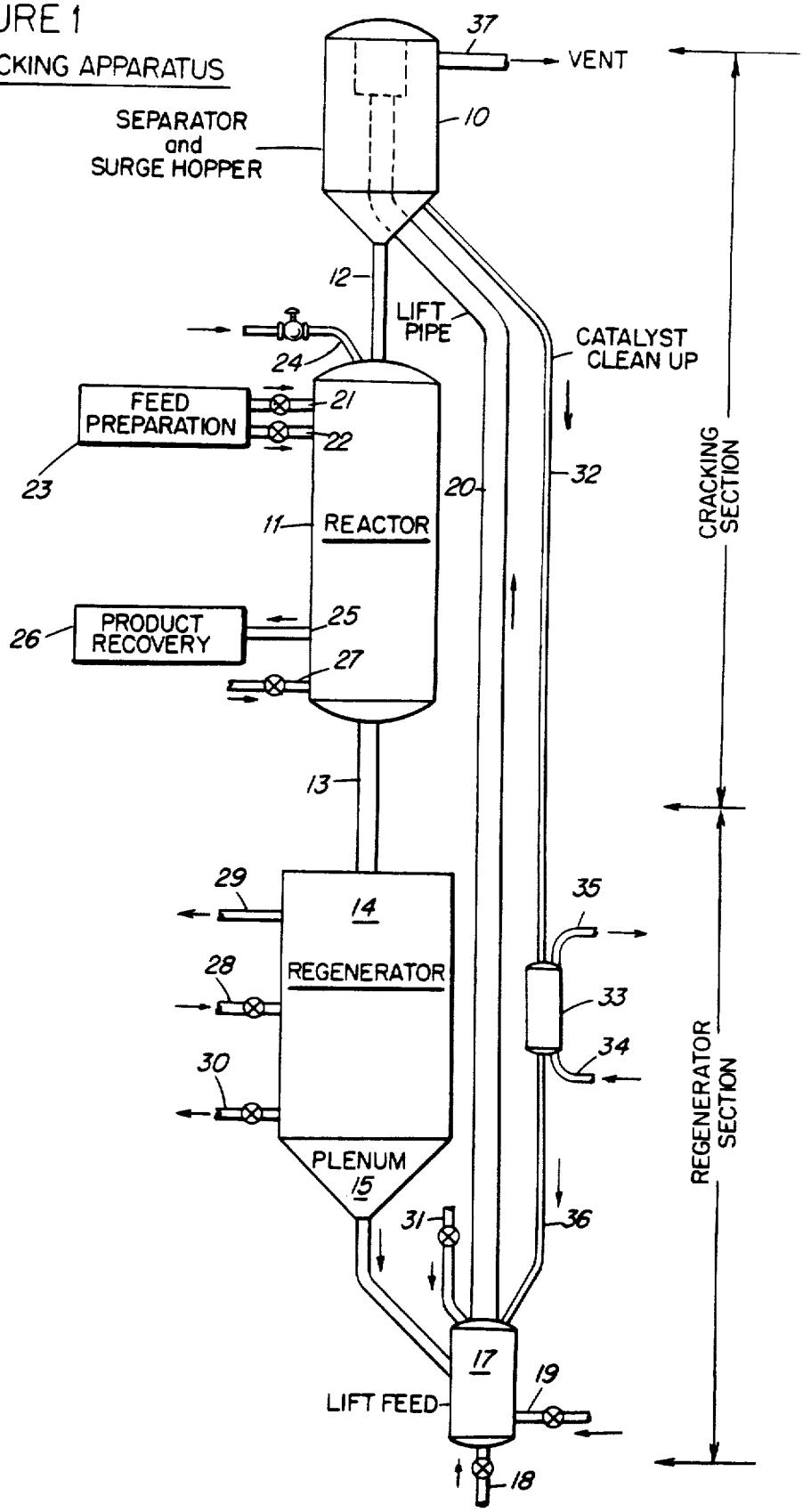
FIG. 1 shows an elevation of a moving bed continuous catalytic cracking apparatus.

The essential features of a continuous catalytic cracking process of the moving bed type are illustrated by FIG. 1 of the drawing.

Turning now to the figure, there is shown a combination separator-surge hopper 10 positioned above a reactor vessel 11 with a gravity feed leg 12 connected therebetween. The reactor which is of circular cross-section as shown but which may be of other shape has a drain leg visible at 13, which connects the bottom of the reactor vessel with the top of a regenerator vessel 14 therebelow. Separating means (not shown) for separating regenerated catalyst from flue gas are provided in the lower portion of vessel 14. Below and/or around the separating means is a gas-filled space commonly referred to as the plenum, situated internally in the region 15. A drain conduit 16 leads from the bottom of the regenerator to a lift feed chamber 17. Lift gas inlet conduits 18 and 19 connect into the lift chamber 17 and a lift pipe 20 extends upwardly from a location within the lift chamber to a location within the upper section of vessel 10. The lift system may take any of a number of forms adapted for accomplishing pneumatic transfer of granular contact material. If desired, a continuous bucket elevator may be substituted for the pneumatic transfer system. The reactor 11 is provided with gas and liquid charge inlets 21 and 22 respectively, near its upper end, and conduits from feed preparation section 23 connect into these inlets. Reactor 11 is also provided with a seal gas inlet 24 at its top and a gas outlet 25, from its lower section, which leads to product recovery section 26. A purge gas inlet manifold 27 connects into the vessel below the gas outlet. The regenerator is provided with an air inlet 28 located along its length and with upper and lower flue outlets 29 and 30, resp., located near its ends. Suitable gas distributor and collector devices may be provided within the regenerator in association with the gas inlet and outlet conduits. Heat exchange tubes (not shown) may be provided within the vessel for purpose of temperature control. The separator 10 also connects to catalyst cleanup conduit 32 which leads into elutriator vessel 33. Vessel 33 is provided with a gas inlet 34 and a catalyst fines and gas outlet 35. Vessel 33 is also provided with conduit 36 which discharges into left feed vessel 17. A catalyst hopper (not shown) is provided with a conduit 31 which discharges into the lift feed. Valved conduit means (not shown) are provided for removing catalyst at will from the circulating inventory. Such means may connect to the reactor vessel 11 or the regenerator vessel 14 or elsewhere. It will be understood that the invention is not limited to the particular reactor or regenerator construction described but is applicable to any construction adapted for effecting moving bed solid contacting operations with a circulating inventory of catalyst.

In considering the operation, the application of the system shown in FIG. 1 to a process of catalytic cracking of petroleum fractions may be taken as typical. A catalyst of about 4 to 20 mesh particle size for example flows by gravity into the reactor 11 from gravity feed leg 12 against the pressure therein. An inert seal gas such as steam or flue gas may be introduced into a seal chamber provided in the head of the reactor so as to maintain a seal gas pressure at the base of the feed leg slightly greater than that in the reactor. A vaporized gas oil charge may be supplied from feed preparation system 23 into the upper section of the reactor via conduit 21. If desired, a high boiling liquid charge may be supplied via conduit 22 either in place of or in addition to the vapor charge. Suitable spray nozzles (not shown) may connect with conduit 22 within the reactor. The hydrocarbons pass downwardly through the substantially compact bed of gravitating granular catalyst maintained in the reaction zone at a suitable reaction temperature within the range about 800°-1100° F. and under a suitable reaction pressure of about 10 to 50 pounds per square inch gauge, for example. The hydrocarbons are converted to gasiform products containing substantial amounts of gasoline and a carbonaceous contaminant is deposited on the catalyst. The gasiform products are disengaged from the spent catalyst and withdrawn separately via conduit 25. The spent catalyst is purged free of gasiform hydrocarbons by means of a suitable inert purge gas such as steam or flue gas which is supplied through conduit 27. The spent catalyst then passes via conduit 13 into regenerator 14, and moves through the regenerator as a substantially compact bed while being contacted with air introduced via conduit 28. The carbonaceous deposits are burned from the catalyst and the gaseous combustion products are withdrawn via upper flue 29 and lower flue 30. The regenerated catalyst passes via conduit 16 to the lift feed tank 17 and is then pneumatically conveyed to the chamber 10 wherein it is separated from the lift gas. The lift gas is withdrawn from the upper section of chamber 10 via pipe 37 and the catalyst returns to the reactor. A small amount of catalyst fines is generated during the cycling of the catalyst. These are continuously removed in a catalyst cleanup loop by allowing catalyst to slowly circulate via conduit 32 into an elutriator vessel 33. In vessel 33, a countercurrent flow of gas suspends and removes the fines via outlet 35 and the cleaned catalyst is returned to the lift feed via conduit 36.

It will be noted from the above that, in operation, catalyst is simultaneously present in vessels 10, 11, 14, 17 and 33, and in the various transfer lines, e.g. liftpipe 20. The sum total of this cracking catalyst is herein referred to as the circulating inventory of cracking catalyst.

A large scale test of the process of the invention was made in an apparatus substantially the same as that shown in FIG. 1 except that the apparatus also included an external catalyst cooler, interposed between the regenerator and line 16, which functioned to control the temperature of the hot regenerated catalyst. The apparatus was a commercial unit designed to crack 10,000 barrels per day of gas oil, and used a circulating inventory of cracking catalyst of about 90 tons. The reactor section had a diameter of about 11.4 ft. superimposed on an 11.4 ft.-diameter regenerator. As shown in the drawing, the regenerator (sometimes called kiln) is a two-zone type, with air flowing counter-current to the catalyst in the top zone and concurrent with the catalyst in the bottom zone. By way of clarification, reference made herein to a specific regeneration zone are to be understood to refer to the region in the regenerator from which the flue gas flows to a particular flue outlet; thus, an apparatus with one flue gas outlet has only one regeneration zone, the apparatus of FIG. 1 has two regeneration zones, etc. This differentiation of regeneration zones may be of considerable significance because the regeneration conditions in the different zones may be materially different; and, the effect of specific conditions on the effectiveness of the platinum promoter may be significant. In the large scale test, for example, the top zone is characterized by a lower average regeneration temperature and a higher average coke concentration than the bottom zone.

The unit customarily processed, as in the large scale test, a light extremely paraffinic gas oil which gave high coversion, high gasoline yields and low gas and coke make. In fact, in ordinary operation the amount of coke available in the regenerator probably induced less than sufficient reflexive heating to optimally crack the feed.

Prior to the large scale test, the unit had been operating for several months adding, to the circulating inventory, about one ton per day of a commercial cracking catalyst of the extrudate type, marketed by Houdry Div. of Air Products and Chemicals, Inc. under the designation HZ-1. The addition was made to compensate for attrition losses. Physical examination of a sample of the circulating inventory made prior to the large scale test showed the presence of cracking catalyst of the bead variety, used prior to the initiation of HZ-1 makeup, as well as the expected pellets.

Approximately 100 tons of on Pt-promoted synthetic bead catalyst, the composition of which will be more fully described hereinafter, was prepared to supply material for the large scale test. This catalyst, herein designated Pt-promoted Synthetic Bead Catalyst, contained dispersed platinum in the concentration of about 4 p.p.m. (that is about 4 pounds of platinum per million pounds of catalyst).

The large scale test was initiated by withdrawing 10 tons of catalyst from the circulating inventory and replacing it with about 11 tons of Pt-promoted synthetic bead catalyst. This substitution was made within about a 24 hour period without otherwise interfering with the operation of the unit. It was observed, on the day after initiating the test, that the catalyst leaving the kiln was hotter than previously by about 64° F. and this hotter catalyst in turn had raised the top of the reactor temperature from 823° to 854° F. An examination of the flue gas from the lower regeneration zone showed that the carbon monoxide content, from that zone, which previously had been 4.7 volume percent, had decreased to zero. Thus, the $CO_2/CO$ ratio in the lower zone of the kiln as a result of the catalyst addition had changed sufficiently to release about 2.3 million BTU/hour. Table 1 summarizes these observations.

Figure 2:
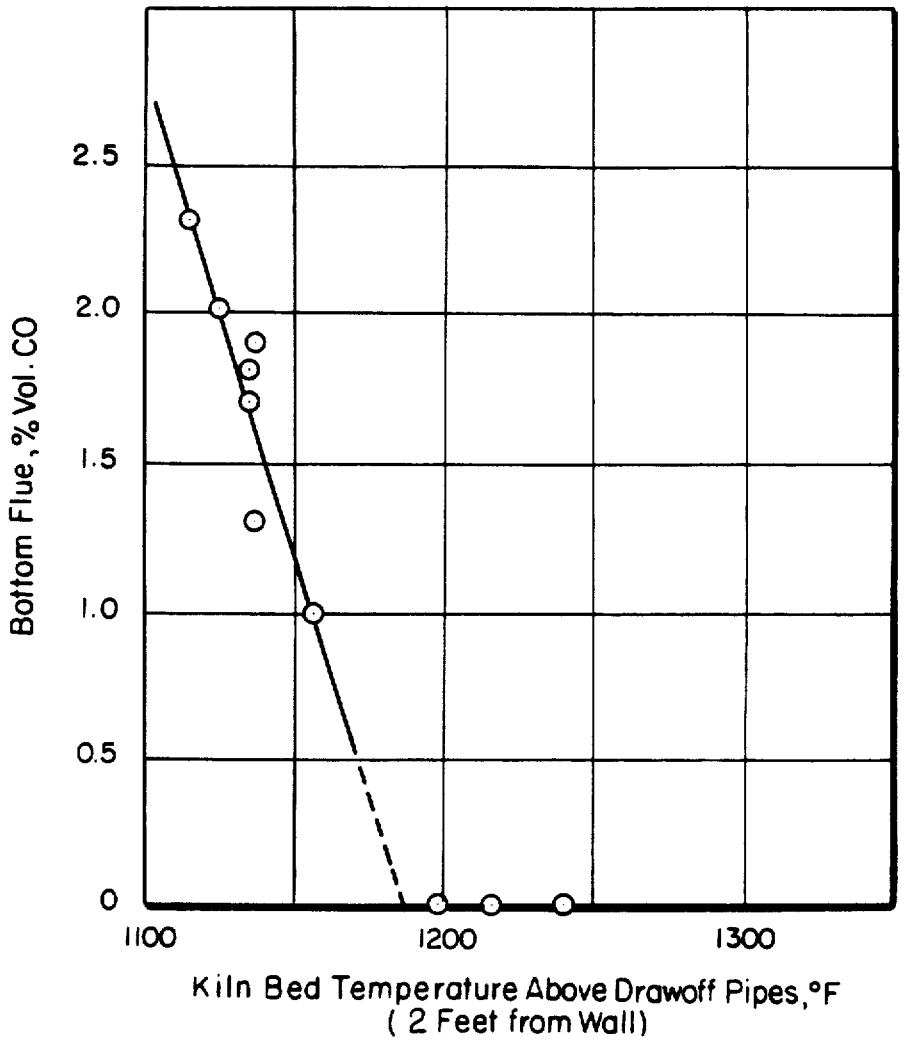
FIG. 2 illustrates effect of kiln-bed temperature on the CO content of flue gas.

Following the introduction of the original 11 tons, additional Pt-promoted synthetic bead catalyst was added to the unit over about a one-month period at a rate of about 1.0 ton per day to replace attrition losses. Orsat analyses of the lower flue gas that the catalyst was still effective in converting CO to $CO_2$ in the lower regeneration zone of the kiln. The effectiveness of the oxidation promoter was found to be greater at higher kiln temperatures, as shown in FIG. 2, but in all cases the CO content was much lower with the Pt-promoted catalyst than with other catalysts. The flue gas composition shown in FIG. 2 were measured after injection of cooling air and are not corrected for dilution.

The composition of the Pt-promoted synthetic bead catalyst utilized in the described test was approximately as follows:

| | |
|---|---|
| 55 wt. % | Silica-Alumina (containing 10 wt. % $Al_2O_3$) |
| 37 wt. % | High density inactive alumina powder |
| 7.6 wt. % | Rare Earth Exchanged Zeolite Y |

The platinum was incorporated in the catalyst by contacting the described composition with $Pt(NH_3)_4Cl_2$ solution prior to final washing and drying. The catalyst analysis showed 4.6 p.p.m. of platinum, 0.1 wt. % $Na_2O$, 0.06 wt. % $Cr_2O_3$, and 1.4 wt. % total rare earth oxide calculated as $RE_2O_3$, to be present.

TABLE I

| | With HZ-1 Makeup | With Pt-Promoted Synthetic Bread Catalyst |
|---|---|---|
| Fresh Feed, BBls./Day | 4220 | 4290 |
| Catalyst Rate, Tons per hour | 124 | 134 |
| TEMPERATURES, °F. | | |
| Catalyst Inlet | 1000 | 1065 |
| Reactor Outlet | 823 | 854 |
| Combustion Air | 923 | 755 |
| CO FROM REGENERATION ZONES, VOL % | | |
| Upper | 5.7 | 6.9 |
| Lower | 4.7 | 0.0 |
| CONVERSION, VOL. % | 75 | 80 |
| Calculated Heat From Regeneration, BTU/LB | 11,500 | 12,230 |

TABLE I-continued

| | With HZ-1 Makeup | With Pt-Promoted Synthetic Bread Catalyst |
|---|---|---|
| Carbon in Coke | | |

Figure 3:
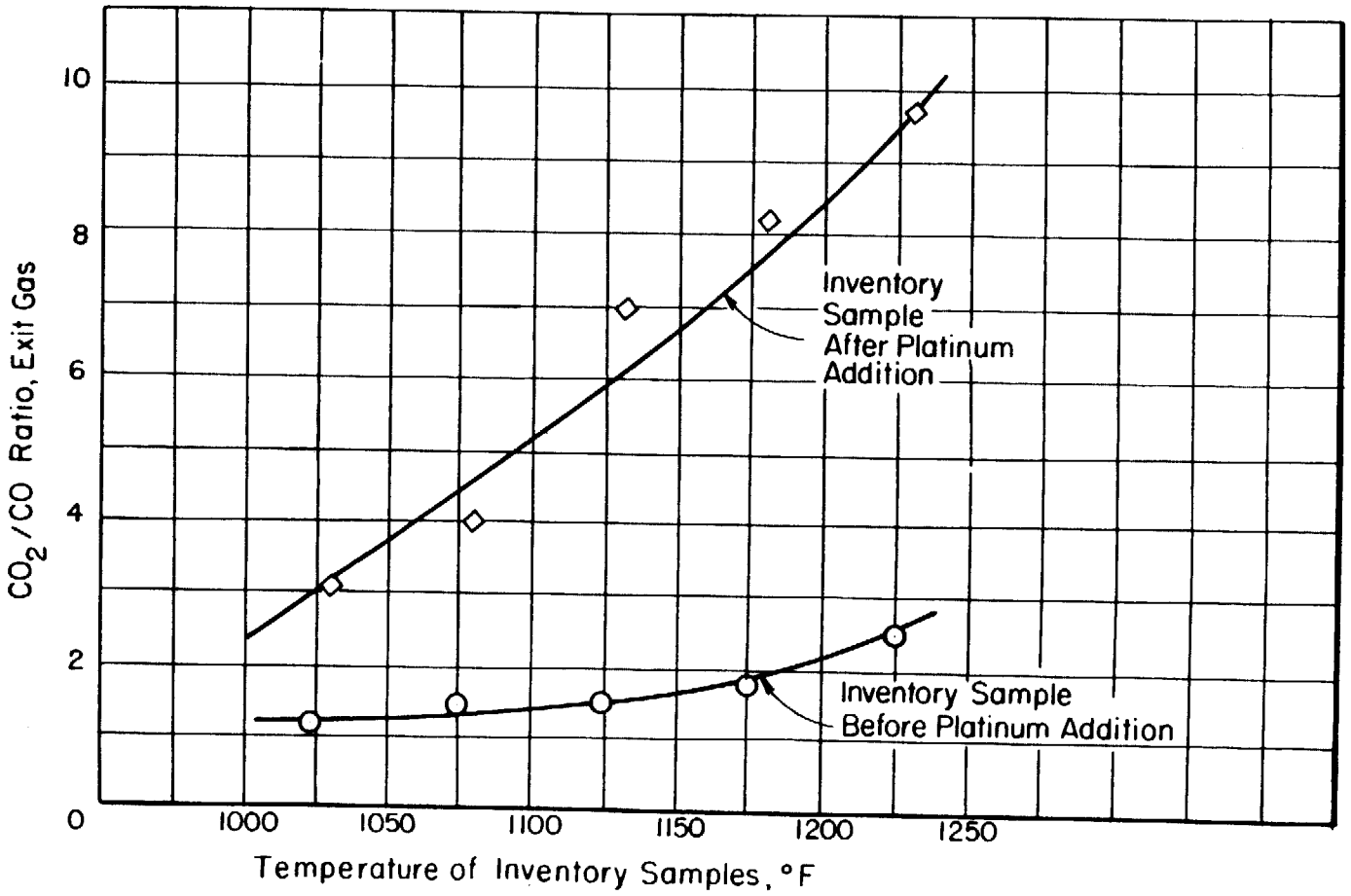
FIG. 3 compares the CO-oxidizing activity of platinum-promoted and prior-art cracking catalysts.

A sample of the circulating inventory of cracking catalyst was taken before initiating the test, i.e. before any of the Pt-promoted cracking catalyst had been added. Another sample of the circulating inventory was taken near the end of the test period, i.e. after addition of about tons of Pt-promoted cracking catalyst. The samples were placed in a small laboratory test furnace and a $CO_2$-free gaseous mixture of CO and oxygen was passed through the catalysts held at different temperatures. The gas exiting from the furnace was analyzed for conversion of CO. The results of these measurements are summarized in FIG. 3 of the drawing.

A comparison is shown in Table 2 of the activity of the Pt-promoted cracking catalyst used in the large scale test with three catalysts of similar composition but containing about 0.2 wt. % chromium instead of platinum.

TABLE 2

| | PRIOR ART | | | Pt-promoted |
|---|---|---|---|---|
| CAT-D5 | A | B | C | Synthetic Bead |
| Conversion, vol % | 70.2 | 69.3 | 69.1 | 69.6 |
| $C_5^+$ Gasoline, vol % | 58.0 | 58.6 | 57.6 | 59.1 |
| $C_4$'s, vol % | 14.9 | 14.0 | 14.7 | 13.8 |
| Dry Gas, wt % | 5.3 | 5.1 | 5.3 | 5.0 |
| Coke, wt % | 3.7 | 3.3 | 3.4 | 3.5 |

The large-scale test described above is to be understood to be illustrative of the present invention and not limiting thereof. Whereas the invention has been described with particular reference to a moving bed system, it is applicable to other continuous catalytic cracking processes that employ a transport bed, such as a fluid catalytic cracking process. Whereas platinum is the preferred promoter, it is to be understood that other promoters, such as ruthenium, rhodium, palladium, osmium, iridium and rhenium may be used to substitute for all or part of the platinum.

In situations where a moving bed system employing a regeneration section comprising two regeneration zones is employed, it is desirable that the promoter metal be present in the circulating inventory of cracking catalyst in an amount effective to convert to $CO_2$ at least about 25% of the CO formed in one of the regeneration zones and substantially ineffective for converting to $CO_2$ the CO formed in the other regeneration zone.

What is claimed is:

1. A method for increasing the reflexive heating of a catalyst in the regenerator section of a moving bed catalytic cracking apparatus with minimal or no detriment to cracking operation, said apparatus comprising a cracking section operating in the absence of added hydrogen, a regeneration section comprising two regeneration zones wherein *coke is burned to form flue gases that contain CO, said* cracking apparatus containing a circulating inventory of inorganic porous acidic solid cracking catalyst comprising a zeolite component consisting essentially of crystalline aluminosilicate zeolite having a pore diameter of 6 to 15 angstroms, which method comprises circulating with said inventory a minute amount of at least one metal of the group consisting of platinum, palladium, iridium, osmium, rhodium, ruthenium,, and rhenium, said metal being dispersed on said cracking catalyst and supported directly thereon by adding said metal to an existing catalyst, said amount being effective to convert to $CO_2$ at least about 25% of the CO formed in one of said regeneration zones and substantially ineffective for converting to $CO_2$ the CO formed in the other said regeneration zone and insufficient to produce more dry gas in said cracking section than is provided by 0.2 wt % chromia.

2. The method of claim 1 wherein said metal is platinum.

3. The method of claim 1 wherein said amount of metal is effective to convert to $CO_2$ substantially all of the CO formed in one of said regeneration zones.

4. The method of claim 3 wherein said metal is platinum.

5. The method described in claim 1 wherein said cracking catalyst contains a measurable amount less than 0.1 wt. % of chromia and said metal is platinum.

* * * * *